United States Patent
Lee et al.

(10) Patent No.: US 6,823,375 B2
(45) Date of Patent: Nov. 23, 2004

(54) SIMULTANEOUS CONFIGURATION OF REMOTE INPUT/OUTPUT HUBS UTILIZING SLAVE PROCESSORS IN A MULTI-PROCESSOR, MULTI-RIO HUB DATA PROCESSING SYSTEM

(75) Inventors: Van Hoa Lee, Cedar Park, TX (US); Kiet Anh Tran, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 730 days.

(21) Appl. No.: 09/798,163

(22) Filed: Mar. 1, 2001

(65) Prior Publication Data
US 2002/0124062 A1 Sep. 5, 2002

(51) Int. Cl.$^7$ .............................................. G06F 15/177
(52) U.S. Cl. ...................... 709/220; 709/221; 709/222; 370/254; 710/8
(58) Field of Search ................................ 709/220, 221, 709/222; 370/254; 710/8

(56) References Cited

U.S. PATENT DOCUMENTS

| | | | |
|---|---|---|---|
| 5,938,765 A | 8/1999 | Dove et al. .................. 713/1 |
| 6,158,000 A | 12/2000 | Collins .......................... 713/1 |
| 6,502,162 B2 * | 12/2002 | Blumenau et al. ............. 711/5 |
| 6,523,082 B1 * | 2/2003 | Yoshida ...................... 710/313 |
| 6,725,317 B1 * | 4/2004 | Bouchier et al. ........... 710/312 |

* cited by examiner

Primary Examiner—Jeffrey Gaffin
Assistant Examiner—Niketa Patel
(74) Attorney, Agent, or Firm—Duke W. Yee; Mark E. McBurney; Lisa L. B. Yociss (57) ABSTRACT

A method, system, and product are described for configuring remote input/output (RIO) hubs within a data processing system. Each one of the RIO hubs is assigned to one of multiple slave processors which are included within the data processing system. Each one of the slave processors which has an assigned RIO hub then configures its assigned RIO hub. Each RIO hub has an associated data structure that is updated with current configuration information by the slave processor assigned to configure that RIO hub. When the slave processor has finished configuring its assigned RIO hub, the slave processor then sets a configuration flag to indicate the completion of the configuration of the RIO hub.

24 Claims, 5 Drawing Sheets

SIMULTANEOUS CONFIGURATION OF REMOTE INPUT/OUTPUT HUBS UTILIZING SLAVE PROCESSORS IN A MULTI-PROCESSOR, MULTI-RIO HUB DATA PROCESSING SYSTEM

BACKGROUND OF THE INVENTION

1. Technical Field

The present invention relates generally to the field of computer systems and, more specifically, to a method, system, and apparatus for configuring multiple remote input/output hubs.

2. Description of Related Art

A logical partitioning option (LPAR) within a data processing system (platform) allows multiple copies of a single operating system (OS) or multiple heterogeneous operating systems to be simultaneously run on a single data processing system platform. A partition, within which an operating system image runs, is assigned a non-overlapping sub-set of the platform's resources. These platform allocable resources include one or more architecturally distinct processors with their interrupt management area, regions of system memory, and input/output (I/O) adapter bus slots. The partition's resources are represented by its own open firmware device tree to the OS image.

Each distinct OS or image of an OS running within the platform is protected from each other such that software errors on one logical partition can not affect the correct operation of any of the other partitions. This is provided by allocating a disjoint set of platform resources to be directly managed by each OS image and by providing mechanisms for ensuring that the various images can not control any resources that have not been allocated to it. Furthermore, software errors in the control of an OS's allocated resources are prevented from affecting the resources of any other image. Thus, each image of the OS (or each different OS) directly controls a distinct set of allocable resources within the platform.

In many systems, I/O devices are incorporated into the data processing system using I/O drawers. These I/O drawers are modular structures that are easy to install and remove allowing for easy modification of the data processing system. The I/O drawers typically contain several I/O expansion slots in which I/O devices may be "plugged" into and used by the data processing system. For example, many I/O drawers allow for 8 or 16 I/O expansion slots.

Each I/O drawer and expansion slot within the I/O drawer must be assigned addresses by the data processing system such that input and output requests from various components within the system may utilize the new hardware. In prior art RIO systems, open firmware peripheral component interconnect (PCI) Host Bridge (PHB) unit addresses are dynamically generated based on dynamic discovery of PHBs on successive Remote Input/Output (RIO) loop probes. A RIO system employs a special I/O bridge, which is called an RIO hub and has several ports to connect to I/O drawers via special high-speed cables. An I/O drawer has two ports. There are two typical RIO loops: 1) one port of a hub connected to the input port of an I/O drawer, and the output port of this I/O drawer connected to the companion port of the same hub; 2) one port of a hub connected to the input port of an I/O drawer, the output port of this I/O drawer connected to the input port of another I/O drawer, and the output port of the other I/O drawer connected to the companion port of the same hub. An RIO loop probe refers to the discovery process to determine the presence of one of these two RIO loops. The ODM of some operating systems, such as, for example, Advanced Interactive Executive (AIX) operating system, use the open firmware device path (e.g. /pci@fba0000000/scsi) as the identifier of an Object Database Management (ODM) object. ODM is a software component of AIX. Hardware functional components such as PCI Host Bridges (PHBs) are represented as ODM objects in the database to be managed by the ODM software.

In known multiple processor, multiple input/output hub data processing systems, the master processor performs the configuration of the remote input/output (RIO) hubs. The other processors in the system, i.e. the slave processors, are idling in a spinning loop waiting for the master processor to complete the RIO configuration before the slave processors are allowed to proceed. With multiple RIO hubs and multiple I/O drawers connected to them, the master processor will take longer to finish the RIO discovery and configuration.

Therefore, a need exists for a multiple processor, multiple RIO hub data processing system in which RIO hubs may be configured approximately simultaneously by the slave processors included within the data processing system.

SUMMARY OF THE INVENTION

A method, system, and product are described for configuring remote input/output (RIO) hubs within a data processing system. Each one of the RIO hubs is assigned to one of multiple slave processors which are included within the data processing system. Each one of the slave processors which has an assigned RIO hub then configures its assigned RIO hub. Each RIO hub has an associated data structure that is updated with current configuration information by the slave processor assigned to configure that RIO hub. When the slave processor has finished configuring its assigned RIO hub, the slave processor then sets a configuration flag to indicate the completion of the configuration of the RIO hub.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The present invention is a method, system, and product for configuring remote input/output (RIO) hubs which are included in a multiple processor, multiple remote I/O hub data processing system. When the system is being initialized, a master processor is selected. The master processor then determines the number of slave processors and identifies each RIO hub in the system. The master processor then assigns each RIO hub to one of the slave processors by passing the RIO hub number to the slave processor.

A data structure is associated with each RIO hub. Each data structure includes a flag which indicates whether the configuration of the RIO hub associated with the data structure has been completed.

Each slave processor then configures its assigned RIO hub. The master processor configures the main RIO hub. When the configuration of an RIO hub is completed, the slave processor responsible for configuring the RIO hub will set the flag included in that RIO hub's data structure to "DONE".

The master processor monitors the status of the configuration flag in each data structure. When all flags are set to "DONE", the master processor then completes the initialization of the computer system.

In this manner, the RIO hubs are configured approximately simultaneously by the slave processors.

Figure 1:
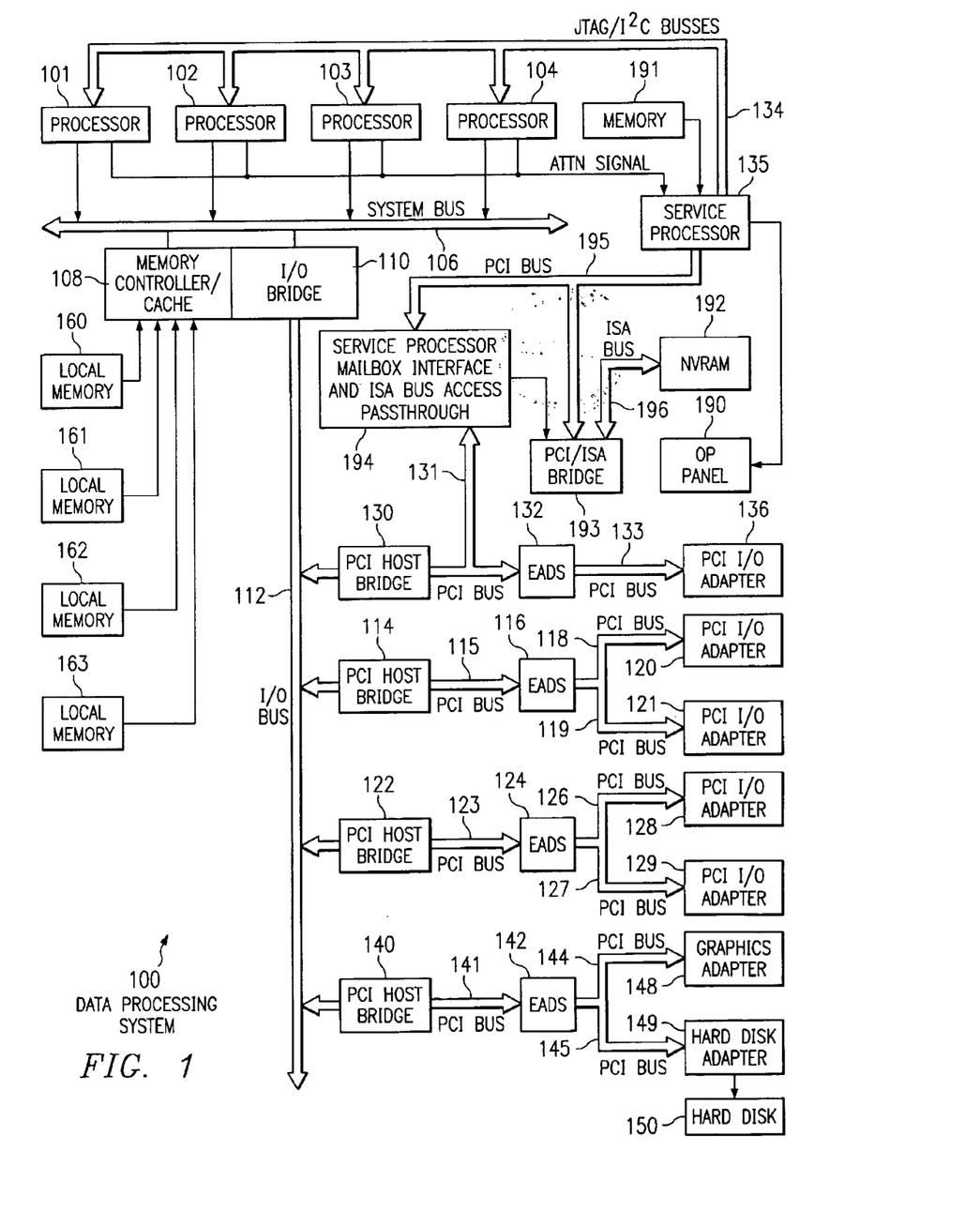
FIG. 1 depicts a block diagram of a data processing system in which the present invention may be implemented.

With reference now to the figures, and in particular with reference to FIG. 1, a block diagram of a data processing system in which the present invention may be implemented is depicted. Data processing system 100 may be a symmetric multiprocessor (SMP) system including a plurality of processors 101, 102, 103, and 104 connected to system bus 106. For example, data processing system 100 may be an IBM RS/6000, a product of International Business Machines Corporation in Armonk, N.Y., implemented as a server within a network. Alternatively, a single processor system may be employed. Also connected to system bus 106 is memory controller/cache 108, which provides an interface to a plurality of local memories 160–163. I/O bus bridge 110 is connected to system bus 106 and provides an interface to I/O bus 112. Memory controller/cache 108 and I/O bus bridge 110 may be integrated as depicted.

Data processing system 100 is a logically partitioned data processing system. Thus, data processing system 100 may have multiple heterogeneous operating systems (or multiple instances of a single operating system) running simultaneously. Each of these multiple operating systems may have any number of software programs executing within in it. Data processing system 100 is logically partitioned such that different I/O adapters 120–121, 128–129, 136, and 148–149 may be assigned to different logical partitions.

Thus, for example, suppose data processing system 100 is divided into three logical partitions, P1, P2, and P3. Each of I/O adapters 120–121, 128–129, 136, and 148–149, each of processors 101–104, and each of local memories 160–164 is assigned to one of the three partitions. For example, processor 101, memory 160, and I/O adapters 120, 128, and 129 may be assigned to logical partition P1; processors 102–103, memory 161, and I/O adapters 121 and 136 may be assigned to partition P2; and processor 104, memories 162–163, and I/O adapters 148–149 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIX) operating system may be executing within partition P1, a second instance (image) of the AIX operating system may be executing within partition P2, and a Windows 2000 operating system may be operating within logical partition P1. Windows 2000 is a product and trademark of Microsoft Corporation of Redmond, Wash.

Peripheral component interconnect (PCI) Host bridge 114 connected to I/O bus 112 provides an interface to PCI local bus 115. A number of Input/Output adapters 120–121 may be connected to PCI bus 115. Typical PCI bus implementations will support between four and eight I/O adapters (i.e. expansion slots for add-in connectors). Each I/O Adapter 120–121 provides an interface between data processing system 100 and input/output devices such as, for example, other network computers, which are clients to data processing system 100.

An additional PCI host bridge 122 provide an interface for an additional PCI bus 123. PCI bus 123 is connected to a plurality of PCI I/O adapters 128–129 by a PCI bus 126–127. Thus, additional I/O devices, such as, for example, modems or network adapters may be supported through each of PCI I/O adapters 128–129. In this manner, data processing system 100 allows connections to multiple network computers.

A memory mapped graphics adapter 148 may be connected to I/O bus 112 through PCI Host Bridge 140 and EADS 142 (PCI-PCI bridge) via PCI buses 141 and 144 as depicted. Also, a hard disk 150 may also be connected to I/O bus 112 through PCI Host Bridge 140 and EADS 142 via PCI buses 141 and 145 as depicted.

A PCI host bridge 130 provides an interface for a PCI bus 131 to connect to I/O bus 112. PCI bus 131 connects PCI host bridge 130 to the service processor mailbox interface and ISA bus access pass-through logic 194 and EADS 132. The ISA bus access pass-through logic 194 forwards PCI accesses destined to the PCI/ISA bridge 193. The NV-RAM storage is connected to the ISA bus 196. The Service processor 135 is coupled to the service processor mailbox interface 194 through its local PCI bus 195. Service processor 135 is also connected to processors 101–104 via a plurality of JTAG/I$^2$C buses 134. JTAG/I$^2$C buses 134 are a combination of JTAG/scan busses (see IEEE 1149.1) and Phillips I$^2$C busses. However, alternatively, JTAG/I$^2$C buses 134 may be replaced by only Phillips I$^2$C busses or only JTAG/scan busses. All SP-ATTN signals of the host processors 101, 102, 103, and 104 are connected together to an interrupt input signal of the service processor. The service processor 135 has its own local memory 191, and has access to the hardware op-panel 190.

When data processing system 100 is initially powered up, service processor 135 uses the JTAG/scan buses 134 to interrogate the system (Host) processors 101–104, memory controller 108, and I/O bridge 110. At completion of this step, service processor 135 has an inventory and topology understanding of data processing system 100. Service processor 135 also executes Built-In-Self-Tests (BISTs), Basic Assurance Tests (BATs), and memory tests on all elements found by interrogating the system processors 101–104, memory controller 108, and I/O bridge 110. Any error information for failures detected during the BISTs, BATs, and memory tests are gathered and reported by service processor 135.

If a meaningful/valid configuration of system resources is still possible after taking out the elements found to be faulty during the BISTs, BATs, and memory tests, then data processing system 100 is allowed to proceed to load executable code into local (Host) memories 160–163. Service processor 135 then releases the Host processors 101–104 for execution of the code loaded into Host memory 160–163. While the Host processors 101–104 are executing code from respective operating systems within the data processing system 100, service processor 135 enters a mode of monitoring and reporting errors. The type of items monitored by service processor include, for example, the cooling fan speed and operation, thermal sensors, power supply regulators, and recoverable and non-recoverable errors reported by processors 101–104, memories 160–163, and bus-bridge controller 110.

Service processor 135 is responsible for saving and reporting error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for deconfiguration during the current running session and future Initial Program Loads (IPLs). IPLs are also sometimes referred to as a "boot" or "bootstrap".

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

Figure 2:
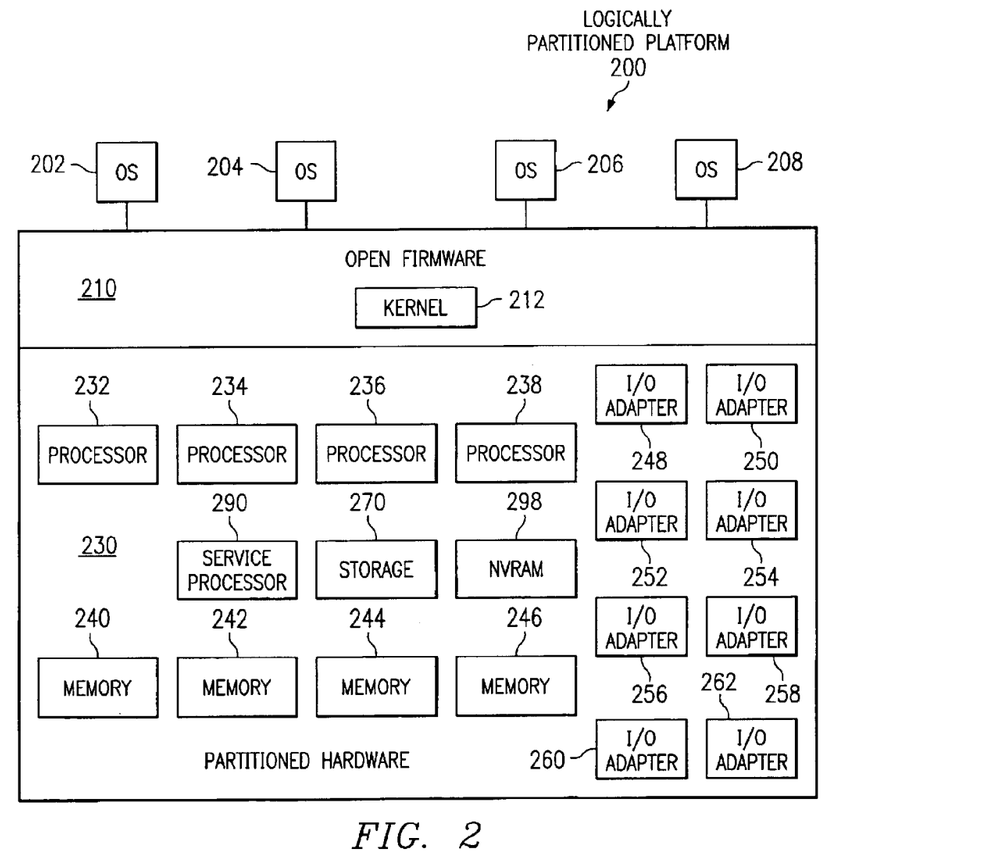
FIG. 2 depicts a block diagram of an exemplary logically partitioned platform in which the present invention may be implemented.

With reference now to FIG. 2, a block diagram of an exemplary logically partitioned platform is depicted in which the present invention may be implemented. The hardware in logically partitioned platform 200 may be implemented as, for example, server 100 in FIG. 1. Logically partitioned platform 200 includes partitioned hardware 230, Open Firmware (OF) 210, and operating systems 202–208. Operating systems 202–208 may be multiple copies of a single operating system or multiple heterogeneous operating systems simultaneously run on platform 200.

Partitioned hardware 230 includes a plurality of processors 232–238, a plurality of system memory units 240–246, a plurality of input/output (I/O) adapters 248–262, and a storage unit 270. Each of the processors 242–248, memory units 240–246, NV-RAM storage 298, and I/O adapters 248–262 may be assigned to one of multiple partitions within logically partitioned platform 200, each of which corresponds to one of operating systems 202–208.

OF 210 performs a number of functions and services for operating system images 202–208 to create and enforce the partitioning of logically partitioned platform 200. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and non-volatile random access memory (non-volatile RAM).

OF 210 is a firmware implemented virtual machine identical to the underlying hardware. Thus, OF 210 allows the simultaneous execution of independent OS images 202–208 by virtualizing all the hardware resources of logically partitioned platform 200. OF 210 may attach I/O devices through I/O adapters 248–262 to single virtual machines in an exclusive mode for use by one of OS images 202–208.

Figure 3:
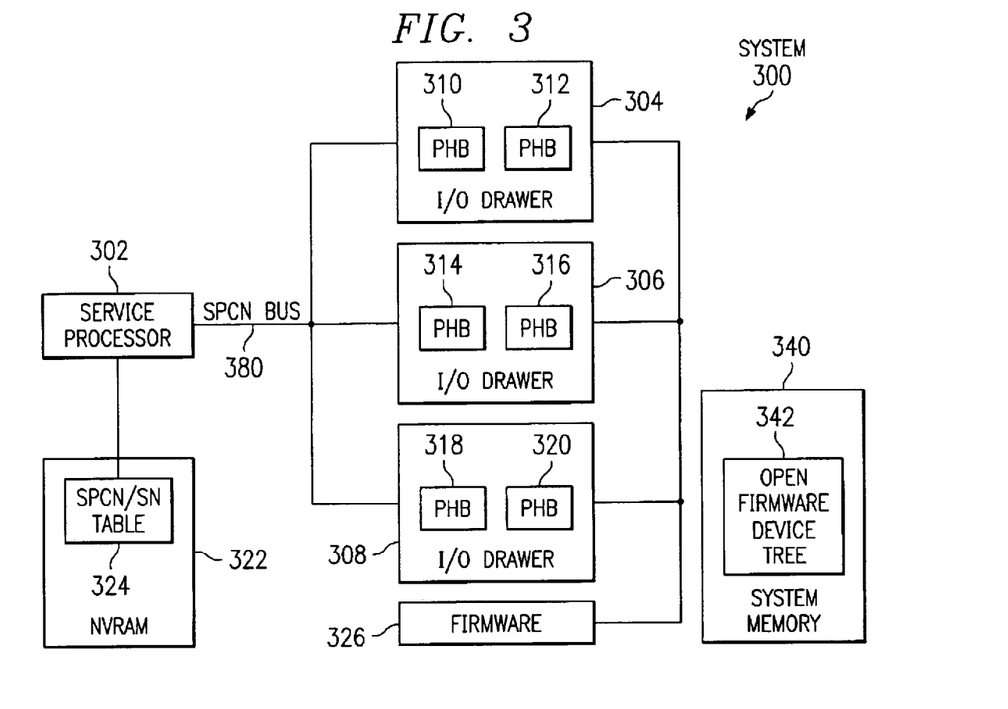
FIG. 3 depicts a block diagram of a system for installing and managing a system I/O drawers in accordance with the present invention.

With reference now to FIG. 3, a block diagram of a system for installing and managing a system I/O drawers is depicted in accordance with the present invention. System 300 may be implemented within a data processing system such as, for example, logically partitioned platform 200 in FIG. 2. A system I/O drawer is a modular component for inserting I/O expansion slots into a data processing system. An I/O drawer physically packages several PHBs to provide PCI I/O slots for plug-in I/O adapters. In FIG. 1, everything attached to I/O bus 112 could reside in an I/O drawer, including the service processor 135. The I/O bus 112 is a special high-speed cable connecting the I/O bridge 110, which is called a hub, to the I/O drawer's input/output ports. The I/O drawer containing the service processor 135 is called the primary drawer. All other I/O drawers are connected via the System Power Control Network (SPCN) bus 380 to the service processor 135.

System 300 includes three I/O drawers 304–308. Each of I/O drawers 304–308 contains two PCI host bridges (PHBs) 310–320. However, although depicted with three I/O drawers 304–308 and two PHBs 310–320, one skilled in the art will recognize that more or fewer I/O drawers and PHBs may be included than depicted in FIG. 3. Each PHB 310–320 may support, for example, between 8 and 16 PCI expansion slots, which may be implemented, for example, as I/O adapters 248–262 in FIG. 2.

Service processor 302, which may be implemented, for example, as service processor 290 in FIG. 2, assigns a unique SPCN ID to each of I/O drawers 304–308 within the system 300. Service processor uses the SPCN bus to detect and assign unique IDs to I/O drawers, to control the power logic of the I/O drawers, and to monitor their environmental sensors such as drawer temperature, fan speed, etc. The SPCN ID is then associated with the drawer's unique serial number from the drawer's Vital Product Data (VPD). The VPD contains information related to the product in which it is found such as, for example, product manufacturer, product serial number, and part number. When a new drawer is added to system 300, service processor 302 changes the SPCN ID of the new drawer to a value not being used by any of the existing I/O drawers 304–308. An SPCN/SN table 324 within NVRAM 322 is updated by service processor 302 to reflect the new assignment of the SPCN ID. NVRAM 322 may be implemented as, for example, NVRAM 298 in FIG. 2. The SPCN/SN table 324 is used in determining if a new I/O drawer is installed since the new I/O drawer's serial number is not in the existing table. From the SPCN/SN table 324, the service processor 302 can find out all SPCN Ids currently used by the existing I/O drawers 304–308 so that it can select an unused SPCN ID for the new drawer. The SPCN ID can be used to label an I/O drawer by displaying its SPCN ID to the I/O drawer LCD operator panel.

System firmware 326, which may be implemented as open firmware 210 in FIG. 2, dynamically discovers the I/O drawers 304–308 and assigned memory mapping to each one of drawers 304–308 and its PHBs 310–320. The location code for the drawer, in one embodiment, is U0.X where X is the SPCN ID of the drawer 304–308. Firmware 326 also creates PHB nodes with the "reg" property. The "reg" property is an open firmware device node property that indicates the unit address of the PHB device with respect to the address space of the parent device node, which is the system root node. In one embodiment, the PHB nodes have the following form: MMMPSSSS SSSSSSSS, where MMM is the RIO drawer type. For example, MMM=0x800 for Outlaw drawer and 0x400 for Outlaw-X drawer. P is the PHB number within the drawer, i.e. 0, 1, or 2. SSSS SSSSSSSS is the low order six bytes of the drawer's VPD Serial Number (SN) keyword data. VPD SN keyword data is the content of the SN field within the Vital Product Data.

Firmware 326 also creates location codes for PHB nodes as, for example, U0.X-P1 where X is the SPCN ID of the drawer. The device nodes and location codes are stored in open firmware (OF) device tree 342 within system memory 340. System memory 340 may be implemented as, for example, memory 191 in FIG. 1. The PHB nodes are parts of the open firmware device tree 342 constructed by open firmware in system memory 340. Since the serial number and SPCN ID are permanently associated and maintained by service processor 302, the ODM of the OS, such as, for example, one of OSs 202–208, will be unchanged for the drawer. AIX Object Database Management (ODM) software allows users to query and manage system configuration.

Figure 4:
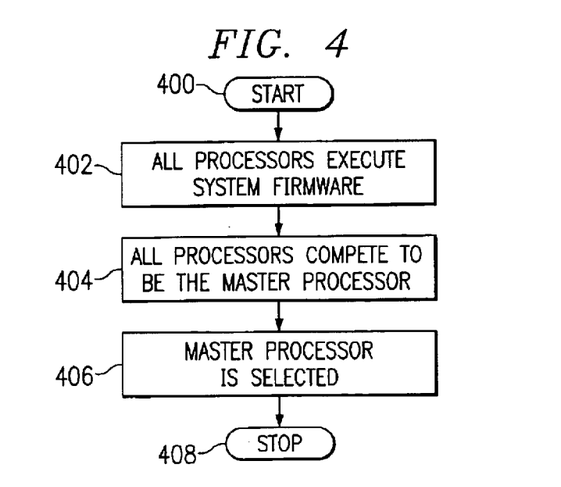
FIG. 4 is a high level flow chart which depicts a selection of a master processor from a plurality of processors included within a data processing system in accordance with the present invention.

FIG. 4 is a high level flow chart which depicts a selection of a master processor from a plurality of processors included within a data processing system in accordance with the present invention. The process starts as depicted by block 400 and thereafter passes to block 402 which illustrates all processors in the system executing system firmware. Next, block 404 depicts all processors in the system competing to be designated as the master processor. Thereafter, block 406 illustrates a master processor being selected. The process then terminates as depicted by block 408.

Figure 5A:
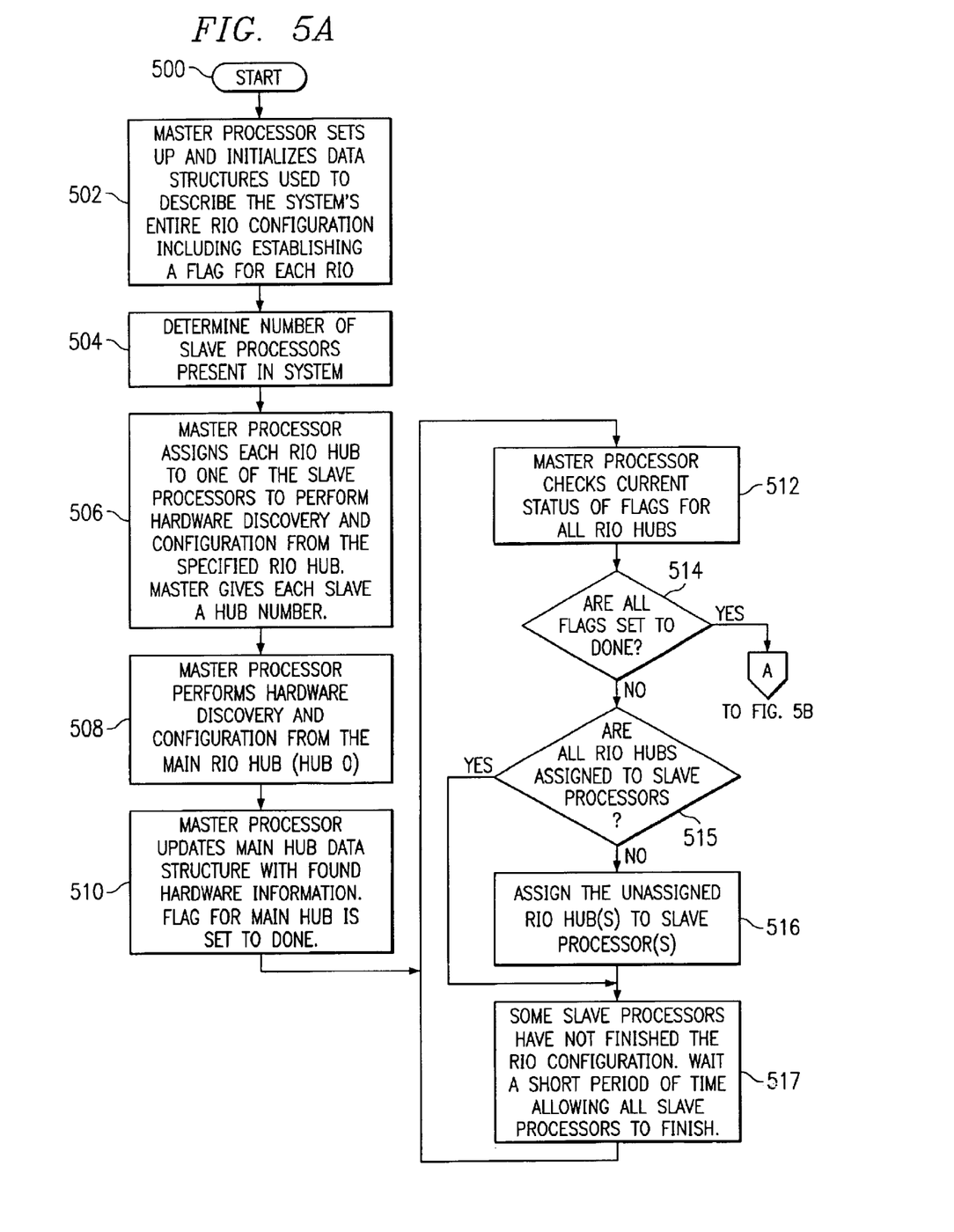
FIGS. 5A and 5B together depict a high level flow chart which illustrates a master processor assigning RIO hubs to slave processors in accordance with the present invention.
Figure 5B:
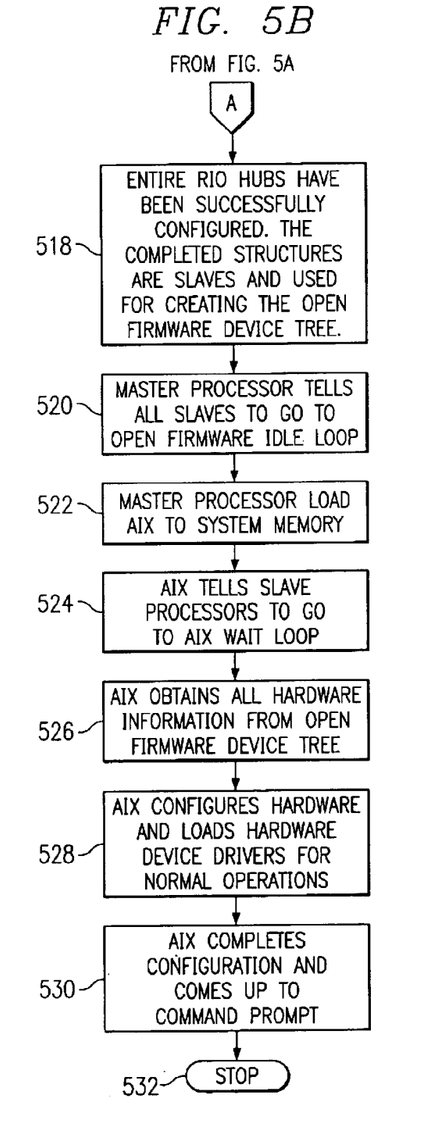

FIGS. 5A and 5B together depict a high level flow chart which illustrates a master processor assigning RIO hubs to slave processors in accordance with the present invention. The process starts as depicted by block 500 and thereafter passes to block 502 which illustrates the master processor setting up and initializing data structures used to describe the system's entire RIO configuration including establishing a flag in each data structure for each RIO. Next, block 504 depicts a determination of the number of slave processors which are present in the system. Thereafter, block 506 illustrates the master processor assigning each RIO hub to one of the slave processors by passing a hub number to a slave processor for each RIO hub assigned to that slave processor. The slave processor obtains the assigned RIO hub number, and is then responsible for performing hardware discovery and configuration from its assigned RIO hub. One slave may be called several times to configure more RIO hubs. However, the processor must successfully complete the RIO hub configuration before it is assigned to do another RIO hub configuration.

The process then passes to block 508 which depicts the master processor performing hardware discovery and configuration from the main RIO hub, i.e. hub 0. Thereafter, block 510 illustrates the master processor updating the data structure for the main hub with the found hardware information. The master processor then sets the flag for the main hub to "DONE". Next, block 512 depicts the master processor checking the current status of the flags for each RIO hub. Block 514, then, illustrates a determination of whether or not all of the flags are set to "DONE". If a determination is made that not all of the flags are set to "DONE", i.e. at least one of the slave processor has not finished the RIO configuration or at least one RIO hub has not been assigned to a slave processor for configuration, the process passes to block 515.

Block 515 depicts a determination of whether any RIO hubs remain unassigned. If a determination is made that one of the RIO hub has not been assigned to any slave processor, the process passes to block 516 which depicts the master processor assigning this RIO hub to one of the slave processors. The process then passes to block 517.

Referring again to block 515, if a determination is made that all of the RIO hubs have been assigned to slave processors, the process passes to block 517.

Block 517 depicts waiting a short period of time to allow all slave processors to finish their work. The process then passes back to block 512.

Referring again to block 514, if a determination is made that all of the flags are set to "DONE", i.e. the entire RIO hubs have been successfully configured, the process passes to block 518 which illustrates the completed structures being saved and used for creating the open firmware device tree. Thereafter, block 520 depicts the master processor telling all slave processors to go to the open firmware idle loop. Next, block 522 illustrates the master processor loading AIX to system memory.

The process then passes to block 524 which depicts AIX telling the slave processors to go to the AIX wait loop. Next, block 526 illustrates AIX obtaining all hardware information from the open firmware device tree. Thereafter, block 528 depicts AIX configuring hardware and loading hardware device drivers for normal operations. Block 530, then, illustrates AIX completing configuration and coming up to the command prompt. The process then terminates as depicted by block 532.

Figure 6:
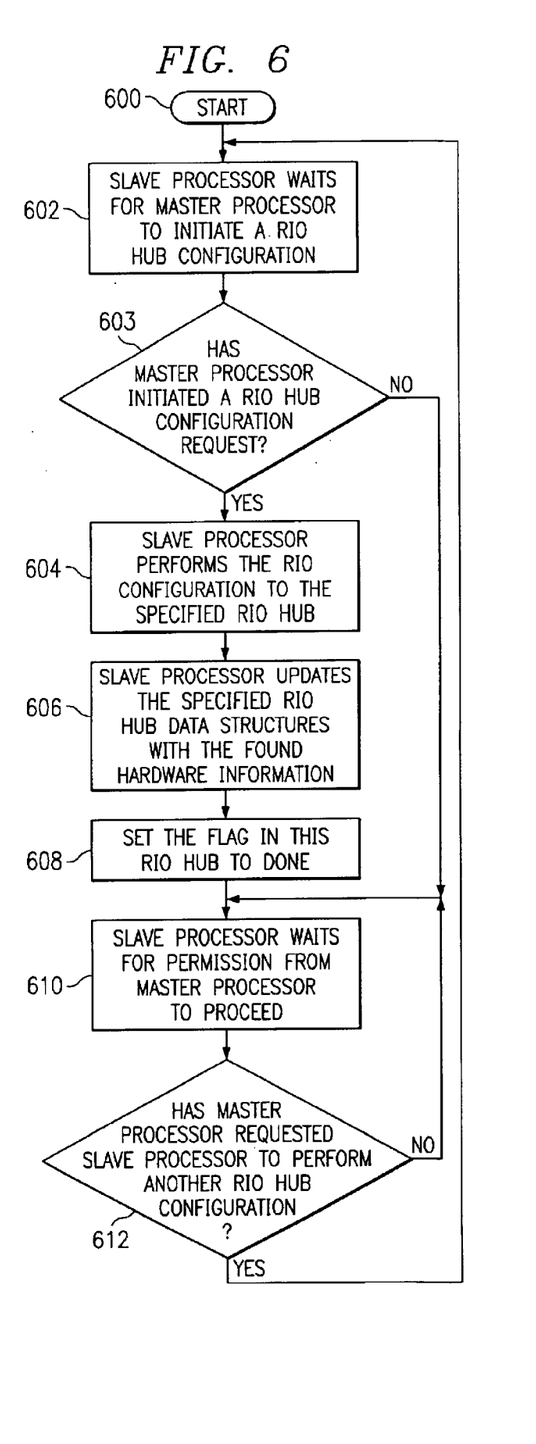
FIG. 6 is a high level flow chart which depicts each slave processor configuring its assigned RIO hub in accordance with the present invention.

FIG. 6 is a high level flow chart which depicts each slave processor configuring an RIO hub in accordance with the present invention. The process starts as depicted by block 600 and thereafter passes to block 602 which illustrates the slave processor waiting for the master processor to initiate an RIO hub configuration. Next, block 603 depicts a determination of whether or not the slave processor has determined that the master processor has initiated an RIO hub configuration request. If a determination is made by the slave processor that the master processor has initiated an RIO hub configuration request, the process passes to block 604. Referring again to block 603, if a determination is made by the slave processor that the master processor has not initiated an RIO configuration request, the process passes to block 610.

Block 604 depicts the slave processor performing the RIO configuration to the RIO hub assigned to this slave processor by the master processor. The process then passes to block 606 which illustrates the slave processor updating the specified RIO hub data structures with the found hardware information. Next, block 608 depicts the slave processor setting the flag in the data structure for the assigned RIO hub to "DONE". Block 610, then, illustrates the slave processor waiting for permission from the master processor to proceed. Thereafter, block 612 illustrates a determination of whether or not the master processor has requested this slave processor to perform another RIO configuration. If a determination is made that the master processor has requested this slave processor to perform another RIO configuration, the process passes to back to block 602. Referring again to block 612, if a determination is made that the master processor has not requested this slave processor to perform another RIO configuration, the process passes to block 610.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of configuring remote input/output (I/O) hubs within a data processing system, each one of said remote I/O hubs being a specialized I/O bridge, each one of said remote I/O hubs being coupled to at least one I/O drawer that includes multiple I/O expansion slots, the method comprising:

competing, by a plurality of processors in said data processing system, to be a master processor;

selecting one of said plurality of processors as said master processor and establishing remaining ones of said plurality of processors as a plurality of slave processors;

assigning, for the purpose of configuring said plurality of remote I/O hubs during initialization of said data processing system, each one of said plurality of remote input/output hubs to one of said plurality of slave processors included within said data processing system;

configuring, by each one of said plurality of slave processors having an assigned one of said plurality of remote input/output hubs, said assigned one of said plurality of remote input/output hubs; and said plurality of remote I/O hubs being configured by said plurality of slave processors and not by said master processor.

2. The method according to claim 1, further comprising the step of configuring said plurality of remote input/output hubs concurrently by said plurality of slave processors.

3. The method according to claim 1, further comprising the step of assigning each one of said plurality of remote input/output hubs to one of a plurality of slave processors utilizing said master processor by passing, from said master processor, by passing a remote I/O hub identifier number of one of said plurality of remote I/O hubs to said one of said plurality of slave processors that is assigned to said one of said plurality of remote I/O hubs a remote I/O hub identifier number of one of said plurality of remote I/O hubs to said one of said plurality of slave processors that is to be assigned to said one of said plurality of remote I/O hubs.

4. The method according to claim 1, further comprising the steps of:

establishing a data structure for each of said plurality of remote input/output hubs; and concurrently updating said data structure for each of said plurality of remote input/output hubs by said plurality of slave processors with current configuration data for each of said plurality of remote input/output hubs.

5. The method according to claim 4, further comprising the steps of:

including a configuration flag in said data structure for each of said plurality of remote input/output hubs; and in response to one of said plurality of slave processors completing configuration of one of said plurality of remote input/output hubs assigned to said one of said plurality of slave processors, setting a configuration flag in a data structure for said one of said plurality of remote input/output hubs to indicate a configuration of said one of said plurality of remote input/output hubs has completed.

6. The method according to claim 5, further comprising the step of assigning each one of said plurality of remote input/output hubs to one of a plurality of slave processors utilizing said master processor by passing, from said master processor, a remote I/O hub identifier number of one of said plurality of remote I/O hubs to said one of said plurality of slave processors that is assigned to said one of said plurality of remote I/O hubs.

7. The method according to claim 6, further comprising the step of monitoring, by said master processor, said configuration flag in said data structure for each of said plurality of remote input/output hubs to determine when a configuration of each one of said plurality of remote input/output hubs has completed.

8. The method according to claim 7, further comprising the step of completing an initialization of said data processing system in response to a determination that said configuration of each one of said plurality of remote input/output hubs has completed.

9. A computer program product of configuring remote input/output I/O hubs within a data processing system, each one of said remote I/O hubs being a specialized I/O bridge, each one of said remote I/O hubs being coupled to at least one I/O drawer that includes multiple I/O expansion slots said computer program product comprising:

instruction means for competing, by a plurality of processors in said data processing system, to be a master processor;

instruction means for selecting one of said plurality of processors as said master processor and establishing remaining ones of said plurality of processors as a plurality of slave processors;

instruction means for assigning, for the purpose of configuring said plurality of remote I/O hubs during initialization of said data processing system, each one of said plurality of remote input/output hubs to one of said plurality of slave processors included within said data processing system;

instruction means for configuring, by each one of said plurality of slave processors having an assigned one of said plurality of remote input/output hubs, said assigned one of said plurality of remote input/output hubs; and said plurality of remote I/O hubs being configured by said plurality of slave processors and not by said master processor.

10. The product according to claim 9, further comprising instruction means for configuring said plurality of remote input/output hubs concurrently by said plurality of slave processors.

11. The product according to claim 9, further comprising instruction means for assigning each one of said plurality of remote input/output hubs to one of a plurality of slave processors utilizing said master processor by passing, from said master processor, a remote I/O hub identifier number of one of said plurality of remote I/O hubs to said one of said plurality of slave processors that is to be assigned to said one of said plurality of remote I/O hubs.

12. The product according to claim 9, further comprising:
instruction means for establishing a data structure for each of said plurality of remote input/output hubs; and
instruction means for concurrently updating said data structure for each of said plurality of remote input/output hubs by said plurality of slave processors with current configuration data for each of said plurality of remote input/output hubs.

13. The system according to claim 12, farther comprising:
instruction means for including a configuration flag in said data structure for each of said plurality of remote input/output hubs; and
in response to one of said plurality of slave processors completing configuration of one of said plurality of remote input/output hubs assigned to said one of said plurality of slave processors, instruction means for setting a configuration flag in a data structure for said one of said plurality of remote input/output hubs to indicate a configuration of said one of said plurality of remote input/output hubs has completed.

14. The product according to claim 13, further comprising instruction means for assigning each one of said plurality of remote input/output hubs to one of a plurality of slave processors utilizing said master processor by passing, from said master processor, a remote I/O hub identifier number of one of said plurality of remote I/O hubs to said one of said plurality of slave processors that is to be assigned to said one of said plurality of remote I/O hubs.

15. The product according to claim 14, further comprising instruction means for monitoring, by said master processor, said configuration flag in said data structure for each of said plurality of remote input/output hubs to determine when a configuration of each one of said plurality of remote input/output hubs has completed.

16. The product according to claim 15, further comprising instruction means for completing an initialization of said data processing system in response to a determination that said configuration of each one of said plurality of remote input/output hubs has completed.

17. A data processing system for configuring remote input/output I/O hubs included within said data processing system, each one of said remote I/O hubs being a specialized I/O bridge, each one of said remote I/O hubs being coupled to at least one I/O drawer that includes multiple I/O expansion slots, comprising:
a plurality of processors in said data processing system concreting to be a master processor;
one of said plurality of processors being selected as said master processor and remaining ones of said plurality of processors being established as a plurality of slave processor;
each one of said plurality of remote input/output hubs being assigned, for the purpose of configuring said plurality of remote I/O hubs during initialization of said data processing system, to one of said plurality of slave processors included within said data processing system;
each one of said plurality of slave processors having an assigned one of said plurality of remote input/output hubs for configuring said assigned one of said plurality of remote input/output hubs; and
said plurality of remote I/O hubs being configured by said plurality of slave processors and not by said master processor.

18. The system according to claim 17, further comprising said plurality of remote input/output hubs being configured concurrently by said plurality of slave processors.

19. The system according to claim 17, further comprising each one of said plurality of remote input/output hubs being assigned to one of a plurality of slave processors utilizing said master processor by passing, from said master processor, a remote I/O hub identifier number of one of said plurality of remote I/O hubs to said one of said plurality of slave processors that is to be assigned to said one of said plurality of remote I/O hubs.

20. The system according to claim 17, further comprising:
a data structure being established for each of said plurality of remote input/output hubs; and
said data structure for each of said plurality of remote input/output hubs being concurrently updated by said plurality of slave processors with current configuration data for each of said plurality of remote input/output hubs.

21. The system according to claim 20, further comprising:
a configuration flag being included in said data structure for each of said plurality of remote input/output hubs; and
in response to one of said plurality of slave processors completing configuration of one of said plurality of remote input/output hubs assigned to said one of said plurality of slave processors, a configuration flag being set in a data structure for said one of said plurality of remote input/output hubs to indicate a configuration of said one of said plurality of remote input/output hubs has completed.

22. The system according to claim 21, further comprising each one of said plurality of remote input/output hubs being assigned to one of a plurality of slave processors utilizing said master processor by passing, from said master processor, a remote I/O hub identifier number of one of said plurality of remote I/O hubs to said one of said plurality of slave processors that is to be assigned to said one of said plurality of remote I/O hubs.

23. The system according to claim 22, further comprising said master processor for monitoring said configuration flag in said data structure for each of said plurality of remote input/output hubs to determine when a, configuration of each one of said plurality of remote input/output hubs has completed.

24. The system according to claim 23, further comprising an initialization of said data processing system being completed in response to a determination that said configuration of each one of said plurality of remote input/output hubs has completed.

* * * * *

UNITED STATES PATENT AND TRADEMARK OFFICE
CERTIFICATE OF CORRECTION

PATENT NO. : 6,823,375 B2
DATED : November 23, 2004
INVENTOR(S) : Lee et al.

It is certified that error appears in the above-identified patent and that said Letters Patent is hereby corrected as shown below:

Column 11,
Line 11, delete "farther" and insert -- further --.
Line 43, delete "I/O" and insert -- (I/O) --.
Line 49, delete "concreting" and insert -- competing --.
Line 53, delete "processor;" and insert -- processors; --.

Column 12,
Line 50, delete ",".

Signed and Sealed this

Twentieth Day of December, 2005

JON W. DUDAS
*Director of the United States Patent and Trademark Office*